(12) United States Patent
Gai et al.

(10) Patent No.: US 10,875,617 B2
(45) Date of Patent: Dec. 29, 2020

(54) HYDRAULIC STEERING SYSTEM FOR A VEHICLE

(71) Applicant: ULTRAFLEX S.P.A., Casella (IT)

(72) Inventors: Marcella Gai, Busalla (IT); Enrico Pagani, Crocefieschi (IT)

( * ) Notice: Subject to any disclaimer, the term of this patent is extended or adjusted under 35 U.S.C. 154(b) by 19 days.

(21) Appl. No.: 15/477,298

(22) Filed: Apr. 3, 2017

(65) Prior Publication Data

US 2017/0283026 A1 Oct. 5, 2017

(30) Foreign Application Priority Data

Apr. 4, 2016 (IT) .......... 102016000034299

(51) Int. Cl.
| | |
|---|---|
| B63H 25/22 | (2006.01) |
| B63H 25/04 | (2006.01) |
| B63H 25/24 | (2006.01) |
| G05D 1/02 | (2020.01) |
| G05D 1/08 | (2006.01) |
| G08G 3/02 | (2006.01) |

(Continued)

(52) U.S. Cl.
CPC .............. *B63H 25/22* (2013.01); *B62D 3/14* (2013.01); *B62D 5/0409* (2013.01); *B62D 5/093* (2013.01); *B63H 25/04* (2013.01); *B63H 25/24* (2013.01); *B63H 25/30* (2013.01); *B63H 25/42* (2013.01); *G05D 1/0206* (2013.01); *G05D 1/0875* (2013.01); *B63H 2025/022* (2013.01); *G08G 3/02* (2013.01)

(58) Field of Classification Search
CPC ........ B63H 25/22; B63H 25/42; B63H 25/04; B63H 25/30; B63H 25/24; B63H 2025/022; B62D 5/093; B62D 3/14; B62D 5/0409; G05D 1/0206; G05D 1/0875; G08G 3/02

See application file for complete search history.

(56) References Cited

U.S. PATENT DOCUMENTS

| | | |
|---|---|---|
| 1,364,872 A | 1/1921 | Feightner |
| 5,234,070 A | 8/1993 | Noah |

(Continued)

FOREIGN PATENT DOCUMENTS

| | | |
|---|---|---|
| DE | 19801393 | 7/1999 |
| DE | 10048697 | 4/2002 |

(Continued)

*Primary Examiner* — Jeffrey C Boomer
(74) *Attorney, Agent, or Firm* — Themis Law

(57) ABSTRACT

A hydraulic steering system for vehicles includes a steering control member; a hydraulic pump provided with a rotatable driving shaft on which the control member is fitted; a hydraulic actuating cylinder connected with two ports of the pump alternately operating as delivery side and return side of the pump and mechanically connected with a direction changing member, which determines a change in the direction by modifying orientation via an actuating cylinder as a function of the supply of hydraulic fluid to the cylinder from the pump by the steering control member. The driving shaft is dynamically connected with an electric motor/transmission assembly, which is activated alternatively by generating a rotational force auxiliary to the movement manually exerted on the steering control member or opposing the manually exerted movement, or by driving to rotate the driving shaft of the pump in place of the manual action driving the steering control member.

11 Claims, 10 Drawing Sheets

(51) Int. Cl.
*B62D 5/04* (2006.01)
*B62D 3/14* (2006.01)
*B63H 25/30* (2006.01)
*B62D 5/093* (2006.01)
*B63H 25/42* (2006.01)
*B63H 25/02* (2006.01)

(56) References Cited

U.S. PATENT DOCUMENTS

| | | | |
|---|---|---|---|
| 2003/0033969 A1 | 2/2003 | Doetsch | |
| 2005/0109556 A1* | 5/2005 | Kubota | B62D 5/0463 180/446 |
| 2005/0181687 A1* | 8/2005 | Okumura | B63H 20/12 440/53 |
| 2006/0063441 A1* | 3/2006 | Saito | B63H 25/02 440/53 |
| 2006/0146074 A1* | 7/2006 | Harrison | B60K 35/00 345/660 |
| 2007/0082567 A1* | 4/2007 | Okuyama | B63H 20/00 440/53 |
| 2007/0197110 A1* | 8/2007 | Takada | B63H 20/12 440/53 |
| 2016/0101838 A1* | 4/2016 | Kojima | B63B 49/00 701/21 |
| 2017/0132016 A1* | 5/2017 | Zilberman | G06F 3/167 |
| 2017/0205828 A1* | 7/2017 | Estabrook | G05D 1/0206 |

FOREIGN PATENT DOCUMENTS

| | | |
|---|---|---|
| DE | 10347179 | 5/2005 |
| DE | 102008021973 | 11/2009 |
| DE | 102010041738 | 4/2012 |
| EP | 0556082 | 8/1993 |
| EP | 1529715 | 5/2005 |
| EP | 2896547 | 7/2015 |

\* cited by examiner

HYDRAULIC STEERING SYSTEM FOR A VEHICLE

FIELD OF THE INVENTION

The present invention relates to a hydraulic steering system for a vehicle, particularly for a watercraft or the like, which system comprises:

at least one steering control member such as a steering wheel, a rudder tiller or helm;

a hydraulic pump provided with a driving shaft rotatable in the two directions and on which the control member is fitted for entraining so as to rotate the driving shaft;

at least one hydraulic actuating cylinder connected with the delivery side and return side of the pump;

the actuating cylinder forming a hydraulic circuit with the pump;

the actuating cylinder being mechanically connected with a direction changing member, which direction changing member determines the change in the direction by modifying its orientation with respect to an axis of the vehicle or of the watercraft, preferably a longitudinal axis;

the change in the orientation of the direction changing member being performed by the actuating cylinder as a function of the supply of hydraulic fluid to the cylinder caused by the operation of the pump by the steering control member.

BACKGROUND OF THE INVENTION

In the case of land vehicles, the direction changing member is composed of at least one or more steering wheels supported so as to oscillate about a substantially vertical axis or an axis having at least one greater direction component in the vertical direction and/or a substantially perpendicular axis or an axis having a greater direction component in the direction perpendicular to the axis of rotation of the wheels.

In the case of watercrafts and/or boats, the direction changing member is composed of a rudder plate and/or a propeller or a combination of such elements.

Particularly in boats provided with at least one outboard motor or an inboard-outboard motor the whole motor or only the foot composing the outboard part can rotate about a substantially vertical axis or an axis having a greater direction component in the vertical direction.

In general, hydraulic steering systems use a double-acting actuating cylinder or possibly two cylinders operating in a manner opposite to each other and the hydraulic pump is intended to cause the hydraulic fluid to flow in two different directions depending on the direction of rotation of the driving shaft of the pump, which is provided with at least two ports for the fluid flow alternately operating as delivery and return side.

In order to direct the delivery fluid flow to one or the other inlet of a double-acting cylinder or to the corresponding single-acting cylinder of a pair of single-acting cylinders operating in a manner opposite to each other, the ports of the pump operating as delivery and return sides are connected to the actuating cylinder inlets by a distributor and depending on the flow direction of the fluid direct the delivery to a corresponding inlet of the double-acting actuating cylinder or to the corresponding single-acting cylinder of the pair of single-acting cylinders, such to cause the direction changing member to move such to obtain the change in the direction set by rotating the steering control member.

In a particularly advantageous arrangement, the hydraulic pump and the distributor, as well as a tank for the hydraulic fluid, typically oil, are integrated in a compact operating unit from which the end of the driving shaft protrudes from at least one head side.

A pump of such type is for example known by documents EP 1382845 and EP 2857680 to the same Applicant.

Such hydraulic steering systems have been widely used above all in nautical field.

Depending on the type of motors and/or of the type of direction changing members and also on the movement conditions of the vehicle or watercraft, the current merely hydraulic systems have drawbacks related to the fact of generating very little resistance to the rotation of the steering control member or of requiring a high effort to rotate the steering control member.

Moreover, it has to be considered that depending on the size of the pushing section of the cylinder and/or on the actuating stroke necessary for it, the number of revolutions of the control member necessary to generate a steering action is high. The change in the section of the cylinder however causes also the change of the force necessary to drive the cylinder and therefore of the force to be applied to the steering control member. Therefore, compromise has to be considered between the required actuating force, number of revolutions and actuating stroke of the cylinder.

Moreover particularly in the nautical field, during long travel path in open sea, the direction control activity by the user is not necessary and therefore it is possible to use automatic pilot systems that by means of sensors can detect the travel conditions of the vessel, such as route, speed, position and the presence of possible obstacles and can act automatically on the basis of the signals obtained by these sensors, on the steering control members to change the route of the vessel.

Automated steering systems, that is automatic pilot systems for watercrafts and boats are known, but currently these are expensive and relatively sophisticated systems providing a so called steer by wire arrangement, where the direction control is generated by an encoder associated to the direction control member that transforms the rotation thereof into an electrical signal. Such signal is in turn processed by a control unit into a corresponding signal driving an actuator moving the direction changing member.

Among others also servo control systems for hydraulic steering systems are known that however are relatively complicated since they work by measuring the pressure in the delivery and return circuit and on the basis of such values, they actuate an auxiliary pump supplying hydraulic fluid to the circuit supplying the hydraulic cylinder.

Currently in the field of hydraulic steering systems it is not possible to provide servo control units that are compact, reliable and relatively cheap and that do not require complicated changes to the steering system.

Moreover, prior art completely lacks a compact and reliable solution for providing a motorized control of the hydraulic pump that allows operating as an automatic steering actuator under the control of a control unit to obtain automatic pilot functions.

SUMMARY OF THE INVENTION

The invention aims at solving the above problem and at achieving advantages related thereto by a hydraulic steering system for a vehicle, in particular for a watercraft or the like, which system comprises:

at least one steering control member such as a steering wheel, a rudder tiller or helm;

a hydraulic pump provided with a driving shaft rotatable in the two directions and on which the control member is fitted for entraining so as to rotate the driving shaft;

at least one hydraulic actuating cylinder connected with the delivery side and return side of the pump;

the actuating cylinder forming a closed hydraulic circuit with the pump;

the actuating cylinder being mechanically connected with a direction changing member, which direction changing member determines the change in the direction by modifying its orientation with respect to an axis of the vehicle or of the watercraft, preferably a longitudinal axis;

the change in the orientation of the direction changing member being performed by the actuating cylinder as a function of the supply of hydraulic fluid to the cylinder caused by the operation of the pump by the steering control member;

and wherein the driving shaft of the hydraulic pump is dynamically connected with an electric motor/transmission assembly, which is activated alternatively according to one of the following options consisting in:

(a) generating a rotational force auxiliary to the movement manually exerted on the steering control member or opposing the manually exerted movement;

(b) driving so as to rotate the driving shaft of the pump in place of the manual action driving the steering control member.

Advantageously in order to allow the operation according to option a) the system provides at least one sensor for the manual rotation of the steering control member generating a signal activating the motor of the electric motor/transmission assembly, which signal is read by a control unit generating the signal for power supplying the electric motor/transmission assembly in a manner corresponding to the signal received from the sensor.

According to a further characteristic that can be provided in combination with the preceding one in order to allow the operation according to option b) the system provides a control for setting at least the automatic steering condition, which control activates the control unit to execute an autopilot program that generates the signal for power supplying the electric motor/transmission assembly on the basis of direction settings entered by the user and/or signals of the conditions of travel along the path and/or of the presence of obstacles along the path transmitted to the control unit by one or more sensors for the travel conditions and/or presence of obstacles.

The dynamic coupling of the electric motor/transmission assembly to the driving shaft of the pump can occur in different modes some examples of which will be described below in more details.

In one embodiment the assembly is composed of an electric motor and a pair of gears rotationally engaged with each other one of them is fitted on the shaft of the motor and the other one on the contrary on the shaft of the hydraulic pump.

Different types of pairs of gears can be provided, such as for example a pair of bevel gears, or a combination of helical screw and gear with axial teeth.

Further alternatives can provide an electric motor and a belt transmission or the like, wherein the belt dynamically rotationally connects the shaft of the electric motor with the driving shaft of the pump.

The electric motor/transmission assembly can be provided in a intermediate position between the manual steering control member and the hydraulic pump.

In a variant embodiment the shaft of the hydraulic pump protrudes by a second end from the head side of the pump opposite to the one fastening the manual steering control member, and the electric motor/transmission assembly is coupled with the shaft of the pump at the second end.

Such solution has the advantage of allowing the electric motor/transmission assembly to be housed under the bridge and of reducing the protrusion of the steering system out of the bridge. This is advantageous as regards both the technical perspective, since electric and mechanical connections are all in a protected position, and as regards the aesthetical perspective since it makes the bridge free from mechanical structures having complicated aesthetical appearance.

As regards the signals detecting a manual action of the steering control member, such signal can be generated by one or more detection sensors that detect the movement of the steering control member and/or of the shaft or even the electromagnetic pulse generated by the electric motor generated when the manual rotation of the steering control member causes the rotor of the electric motor to rotate.

The control unit can be further associated to sensors measuring the movement condition of the vehicle and particularly of the watercraft and/or setting the travel conditions of the vehicle and particularly of the watercraft which generate signals corresponding to the conditions while the control unit executes a control program that determines, on the basis of the signals, which is the activation signal of the electric motor/transmission assembly as regards an effect, with a predetermined force, auxiliary to the steering action manually operated through the steering control member or an effect, with a predetermined force, opposing the steering action manually exerted on the steering control member.

Obviously, the control unit is provided with a processor and with memories for storing data and the control program and for executing it.

The system can also comprise an interface displaying settings and/or data corresponding to the signals generated by the sensors and the corresponding operating mode of the electric motor/transmission assembly.

According to one embodiment the system comprises an electronic control unit with at least a memory and one processor, which memory contains a control program for processing data about the movement conditions of the vehicle, such as for example its location, the set route, the followed route, the speed with respect to a geostationary system for example a GPS system, the speed with respect to the ground or fluid, wind direction and speed, the trim of the watercraft and number of revolutions of the motor or motors, the presence of obstacles on the route and/or in the surroundings and their relative movements and for generating controls driving the electric motor/transmission assembly for the automatic control of direction changing members on the basis of any combination or sub-combination of the data acquired by the sensors.

Still according to a further characteristic, the system can comprise a display connected to the control unit and a program displaying the cruising conditions and setting the steering system, which program generates on the display a graphical interface displaying the data, for example in the form of a route on a nautical chart or a path on a road map.

As regards the control unit, the sensors, the processor, the display and memories as well as peripheral units, they can be made according to any available technology as an option for the person skilled in the art. This is valid not only as regards hardware, but also as regards software and firmware relating to control program and to the program generating display interfaces.

Individual units such as sensors and control unit and other operating units can communicate through cable according to different protocols or even at least partially in wireless mode. Also in this case the communication protocols can for example be types of protocols used in the field of transport, such as for example BUS CAN or other types of protocols.

BRIEF DESCRIPTION OF THE DRAWINGS

These and other characteristics and advantages of the present invention will be clearer from the following description of some embodiments shown in the annexed drawings wherein.

DETAILED DESCRIPTION OF EMBODIMENTS OF THE INVENTION

Figure 12:
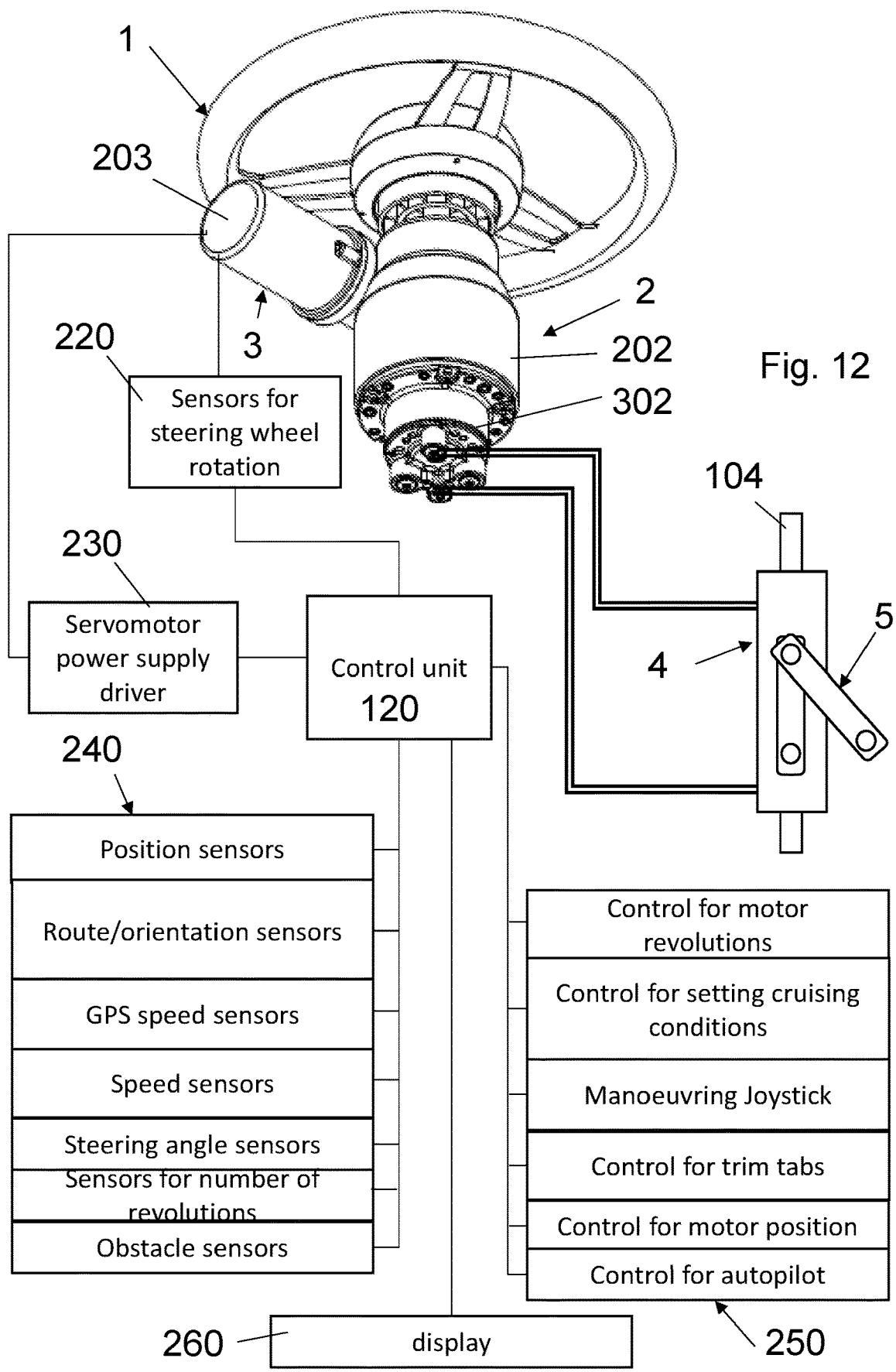
FIG. 12 is a simplified block diagram of one embodiment of the system according to the present invention that only by way of example and not as a limitation comprises one embodiment according to FIGS. 1 to 3, but that can be combined with any of the described embodiments.

With reference to FIG. 12, a system steering a vehicle, such as a marine vehicle and particularly a watercraft, comprises at least one manual steering control member that can be of any kind and that in the shown examples is in the form of a steering wheel 1.

The steering wheel 1 is fitted on the end of a driving shaft of a pump, tank 202 and distribution valve 302 assembly, generally denoted by 2.

Such assembly, which will be identified in short as hydraulic pump 2, can be made in different ways, one of them being described for example in documents EP 1382845 and EP 2857680 to the same Applicant, whose disclosures are part of the present disclosure.

As an alternative, other types of pumps are possible such as for example the gear pump described in document IT0001408662 or the Gerotor pump described in document SV2002A000031 to the same Applicant.

Figure 1:
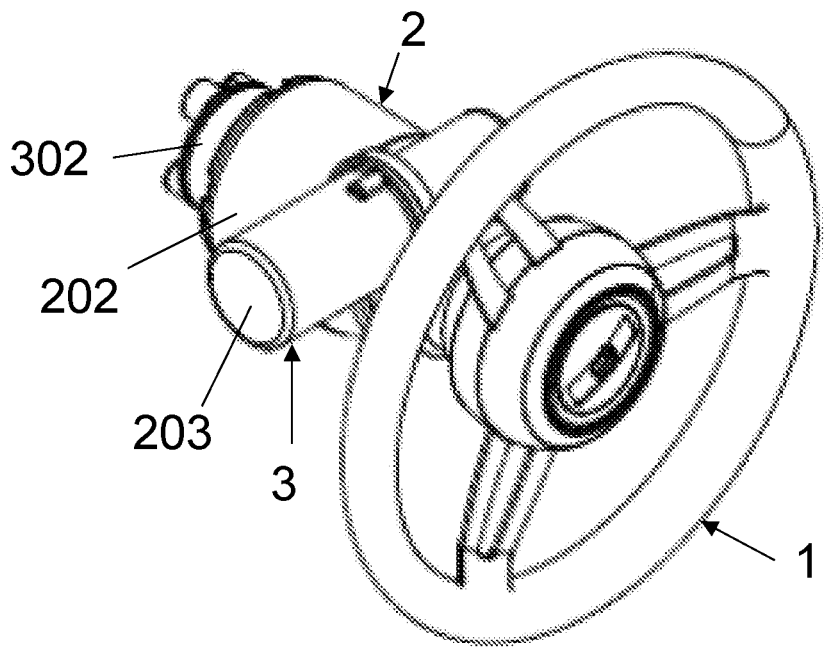
FIGS. 1 to 3 are different views of a first embodiment of the invention where the electric motor of the electric motor/transmission assembly is oriented perpendicularly to the axis of the driving shaft of the hydraulic pump and the electric motor/transmission assembly is mounted on the shaft of said hydraulic pump on the same side of the pump where the steering wheel is mounted.
Figure 2:
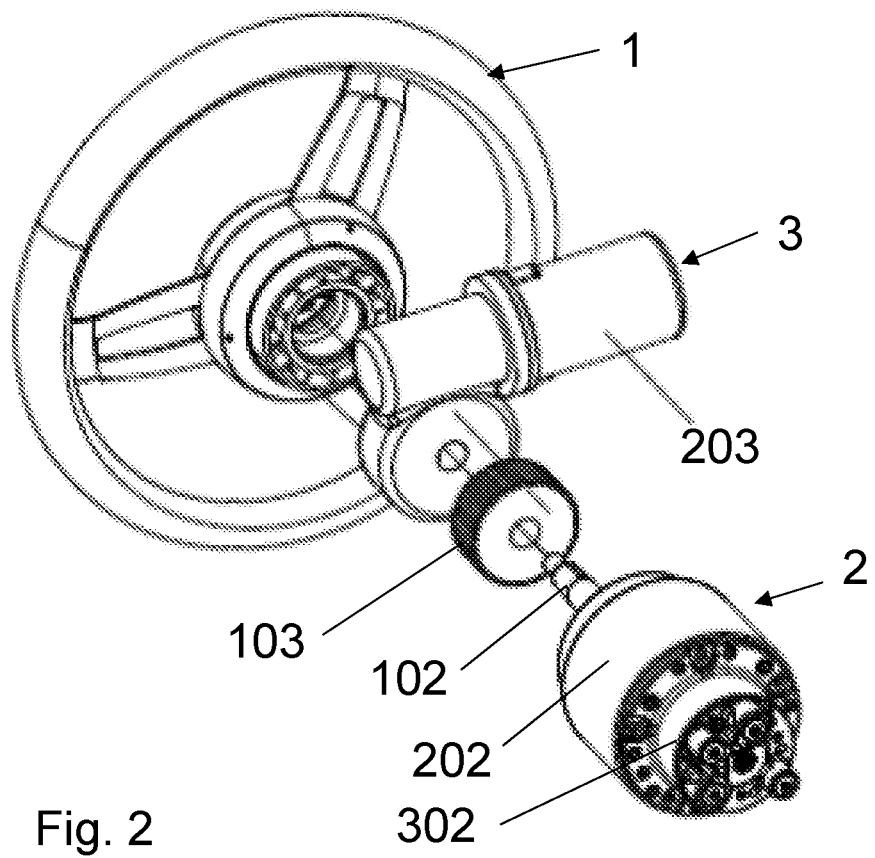
Figure 3:
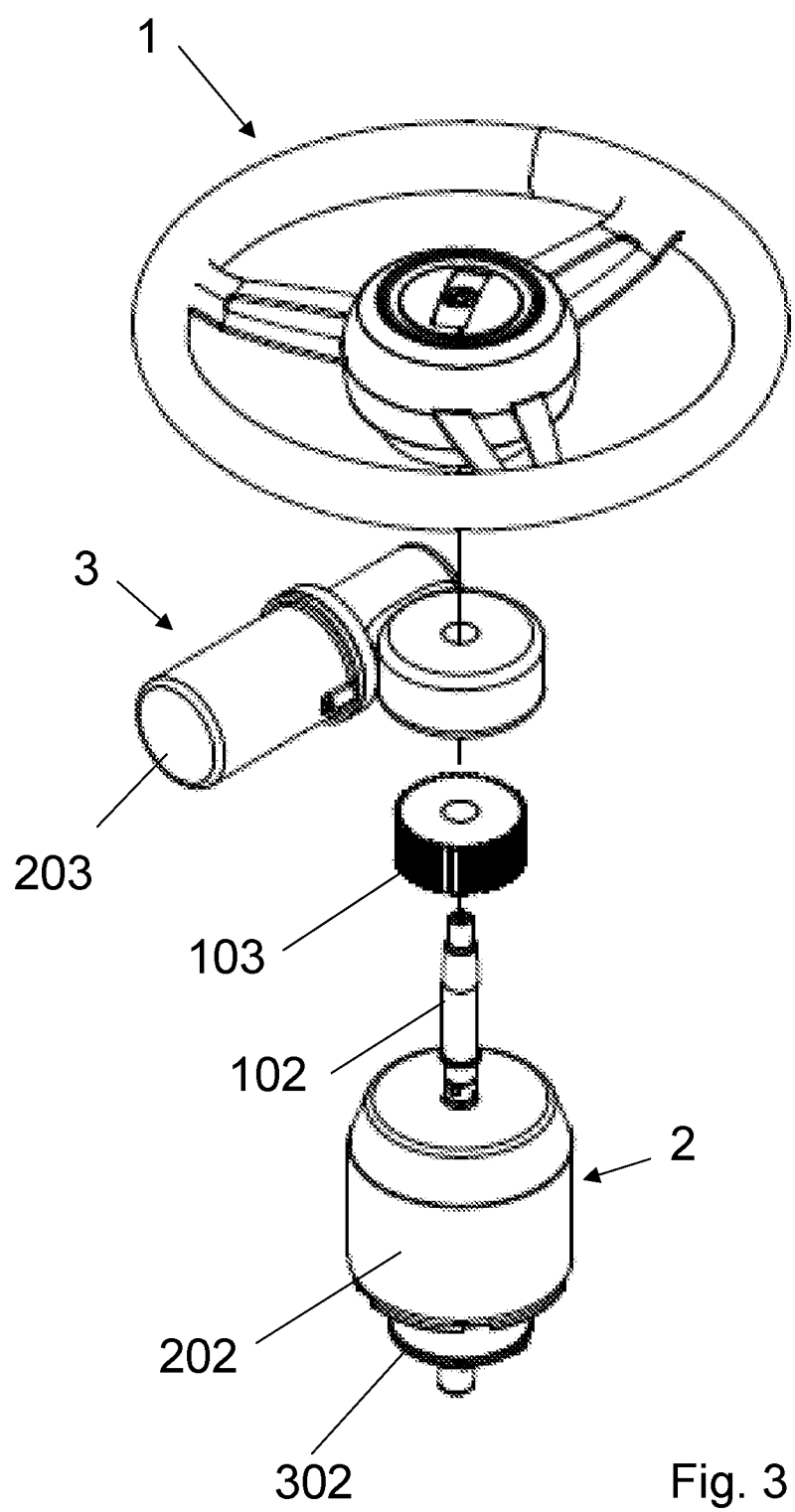

As it can be seen in greater detail in FIGS. 1 to 3, in an intermediate position between the steering wheel 1 and the case of the hydraulic pump 2 on the same driving shaft 102, a pinion 103 of an electric motor/transmission assembly is fitted, which comprises an electric motor 203 whose shaft engages the pinion by a helical screw that is not shown in detail.

The axis of the shaft of the motor 203 is oriented perpendicularly and eccentrically with respect to the axis of the driving shaft 102 of the hydraulic pump 2.

The outlets of the distributor 302 of the hydraulic pump 2 are connected through hydraulic ducts to the inlets of a double-acting hydraulic cylinder 4. In the version provided for outboard motors, the rod 104 of the hydraulic cylinder 4 is generally stationary, while, due to the effect of the hydraulic fluid supplied in one or in the other flowing direction depending on the direction of rotation of the steering wheel 1, the body of the cylinder moves along the rod, which is connected to one or more direction changing members by means of articulated arms 5.

As an alternative to a double-acting cylinder it is also possible to provide two single-acting cylinders operating in a mutually opposite direction.

A control unit 120, which comprises at least one processing unit in the form of a processor and one or more memories configured to cooperate with the processor, executes a logic control program stored into one of said memories (not shown in detail).

At one input of the control unit, at least one sensor 220 is connected for detecting a manual action rotating the driving shaft 102 of the pump 2 through the steering wheel 1.

The sensor can also be composed of the electric motor 203, which, following an action rotating the shaft thereof, generates an electromagnetic signal sent to the control unit 120 and interpreted by the control program. On the basis of the analysis of such signal detecting the manual operation of the driving shaft 102 of the pump 2, the control unit 120 calculates which type of signal to be sent to a driver 320 generating the signal power supplying the electric motor.

As it will become clearer later, such signal can be a signal driving the electric motor to exert an action rotating the shaft 102 of the hydraulic pump consistent with the rotation exerted by the steering wheel and, therefore, the electric motor/transmission assembly 3 provides an action that is auxiliary to the manual action. On the contrary, said signal driving the electric motor/transmission assembly can be a signal driving the electric motor such that the action rotating the electric motor/transmission assembly on the driving shaft 102 of the pump 2 is contrary and opposed to the rotating action manually exerted through the steering wheel 1. Such opposing action generates a braking or a resistance to the manual rotation that can be sought by the user and that can also be regulated, both in a fixed manner by being preventively set or in a dynamic manner by analyzing the travel conditions of the vehicle in the environment.

To this end, as it can be seen from the figure, the control unit 120 can be connected to a plurality of different sensors generally denoted by 240, each of which detects specific movement conditions of the vehicle.

The example concerns particularly the preferred embodiment related to a watercraft, which, however is not a limiting embodiment since the illustrated example is easily and obviously modifiable for a land vehicle or other type of vehicle, for example a hybrid one.

Among the detection sensors 240, it is possible to provide, for example, in any combination or sub-combination:

position sensors, such as GPS sensors or the like;

sensors for the route or orientation of the vehicle, such as a compass or GPS tracking;

speed sensors, such as for example a unit determining the speed by GPS tracking, and/or detecting the speed relative to the road for land vehicles or water for watercrafts;

sensors for steering angle that is the change in orientation carried out by the watercraft;

sensors for the steering angle taken by the direction changing members;

sensors for the number of revolutions of one or more motors;

sensors for the direction of the wind and/or strength of the wind;

sensors for obstacles, such as radar sensors, proximity sensors;

other types of sensors such as accelerometers or the like.

The signals received by such sensors can be provided to the control unit 120 where a control program is stored which stores, analyzes and estimates the signals obtained from one or more of said sensors and on the basis of said signals sets the type of signal powering the electric motor, both in regard to the functionality auxiliary to or opposing the manual steering action and in regard to the force and/or speed driving the motor.

With reference again to the control unit, it is possible to connect one or more different control members for different functionalities, generally denoted by 250.

Among the above-mentioned ones, it is possible to provide in any combination or sub combination:

a control to set the number of revolutions of one or more motors;

a control for reversing the travel of one or more motors;

a control for setting the travel conditions, such as for example quick cruising, comfort cruising, slow cruising, maneuvering, mooring etc. In this case the steering members of the boat can be regulated by the control unit in operating conditions preset and stored in a memory of the control unit 120 during a setup phase;

a maneuvering joystick for mooring maneuvers;

controls for regulating trim flaps or tabs also known as trim tabs;

controls for regulating the position of outboard motor.

The control program executed by the control unit 120 can set the signal powering the electric motor in a mode auxiliary to or opposing the manual steering action only or also on the basis of settings set by the user due to one or more of said controls.

For example, by setting a slow cruising or maneuvering condition, it is possible to power the electric motor/transmission assembly with a power signal to exert an action auxiliary to the manual action such to make the steering wheel less resistant to rotation, obtaining a soft steering that promotes steering speed, while in a quick cruising condition it is possible to generate a power signal by means of which the electric motor/transmission assembly operates opposing the manual action, to make more rigid or harder, that is, to generate a given resistance to the displacement of the direction changing member, for example a rudder plate or an outboard motor or a foot of a inboard-outboard motor so not to run the risk of accidentally steering or anyway of steering too quickly when cruising.

Operating conditions can be displayed on a display 260 that can be of the touch type. In this case, at least some of the above described controls can be made in the form of a graphical control, while other controls can be made in the form of switches and/or levers or the like.

With the aim of providing a display graphical and/or control interface, the control unit executes a program generating and controlling a graphical interface also stored in a memory of the control unit.

According to an additional variant, it is possible to provide also a control for setting the autopilot condition.

Such control causes the control unit 120 to call and to execute an autopilot program, which, on the basis of one or more of the detection signals of one or more of the above listed sensors 240, generates a signal powering the electric motor/transmission assembly 3 operating the driving shaft 102 of the pump 2 regardless of a manual steering action exerted on the wheel.

In a simple arrangement, the signals supplied to the autopilot program can be those derived from the position and GPS tracking and, therefore, position, direction and speed and also signals detecting obstacles both detected by sensors and resulting from a map of the area.

As an alternative, it is possible to cross check or integrate such information with additional measurement signals of the above-mentioned sensors and/or with one or more settings activated by one or more of the above listed controls.

According to another feature, the display can show the map and the vehicle, as well as the tracking corresponding to the path thereof.

Still according to a feature, it is possible to provide the automatic pilot condition to be automatically disabled when a manual steering action is exerted through the wheel 1 or an equivalent steering member.

Although the overall system in its different variants has been described with reference to the embodiment of FIGS. 1 to 3, it is applicable to any of the other shown embodiments.

Figure 4:
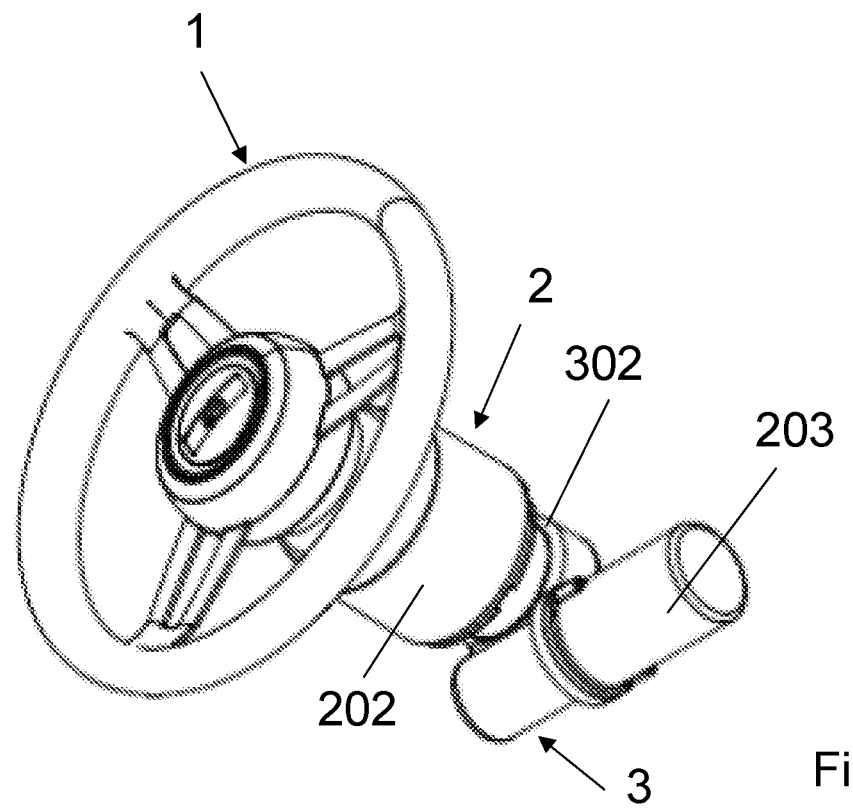
FIGS. 4 to 6 is a variant of the embodiment of the previous figures where the driving shaft of the hydraulic pump extends beyond the head side opposite to the side fastening the steering wheel the electric motor/transmission assembly being coupled to the driving shaft at said extension.
Figure 5:
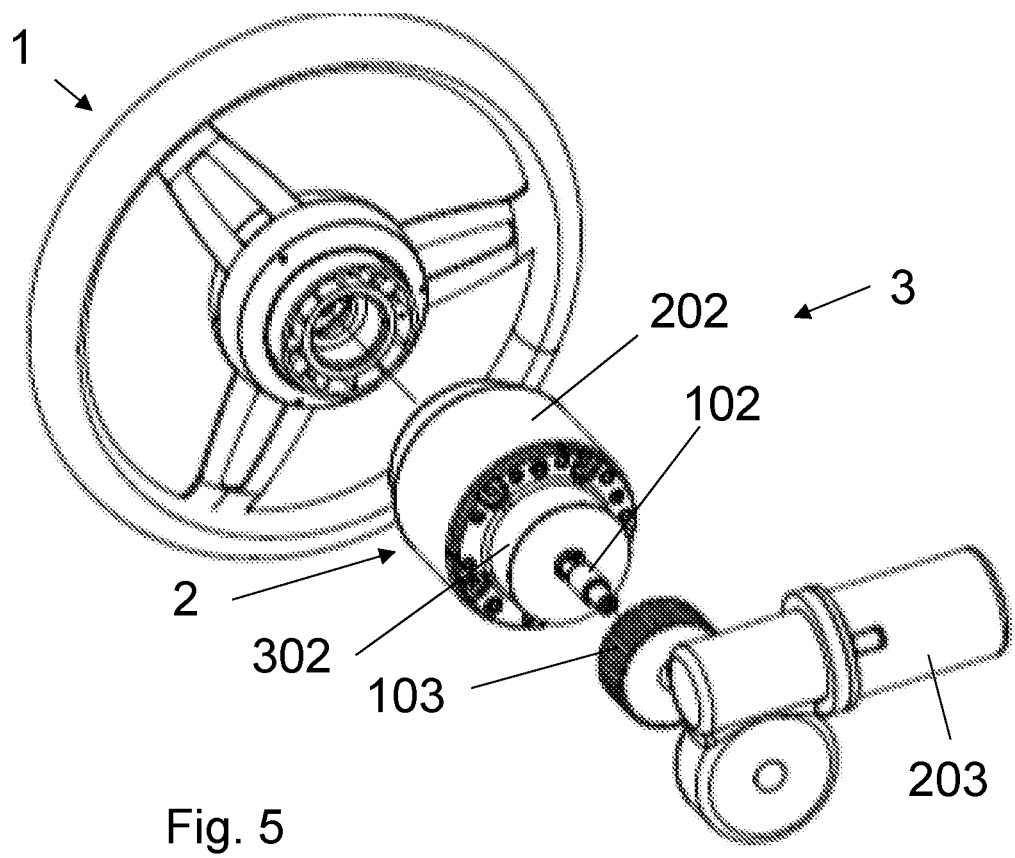
Figure 6:
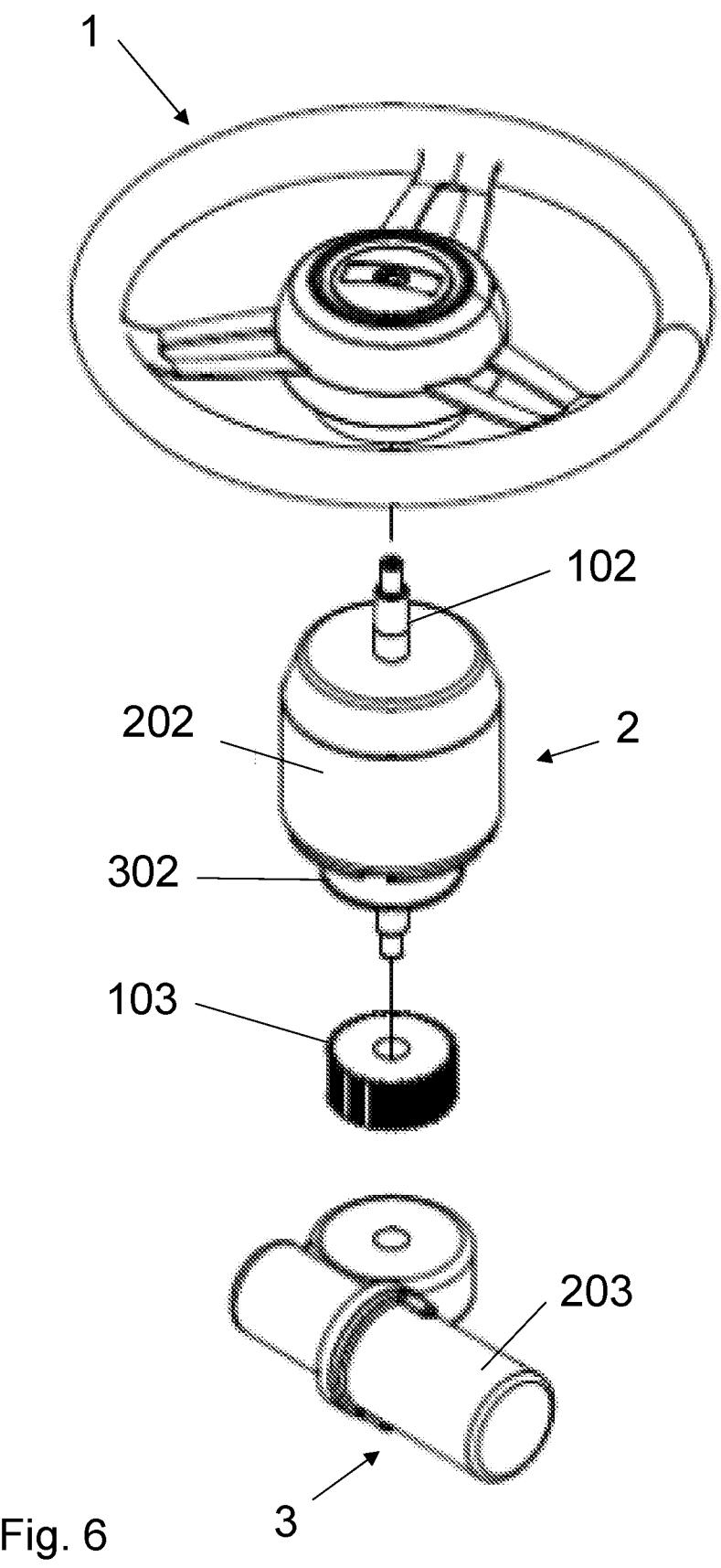

FIGS. 4 to 6 show a variant embodiment where the driving shaft of the pump is extended on the side of the hydraulic pump where the distributor 302 is provided.

In this case the pinion 103 is fitted on said extension of the shaft 102 and, therefore, the motor with the helical screw is placed rearwardly of the distribution valve.

This is advantageous since such electric motor/transmission assembly 3 with the different electrical connections is inside the compartment of the bridge, making it possible to reduce the protrusion of the steering wheel from the bridge and to have an aesthetically cleaner arrangement.

Figure 7:
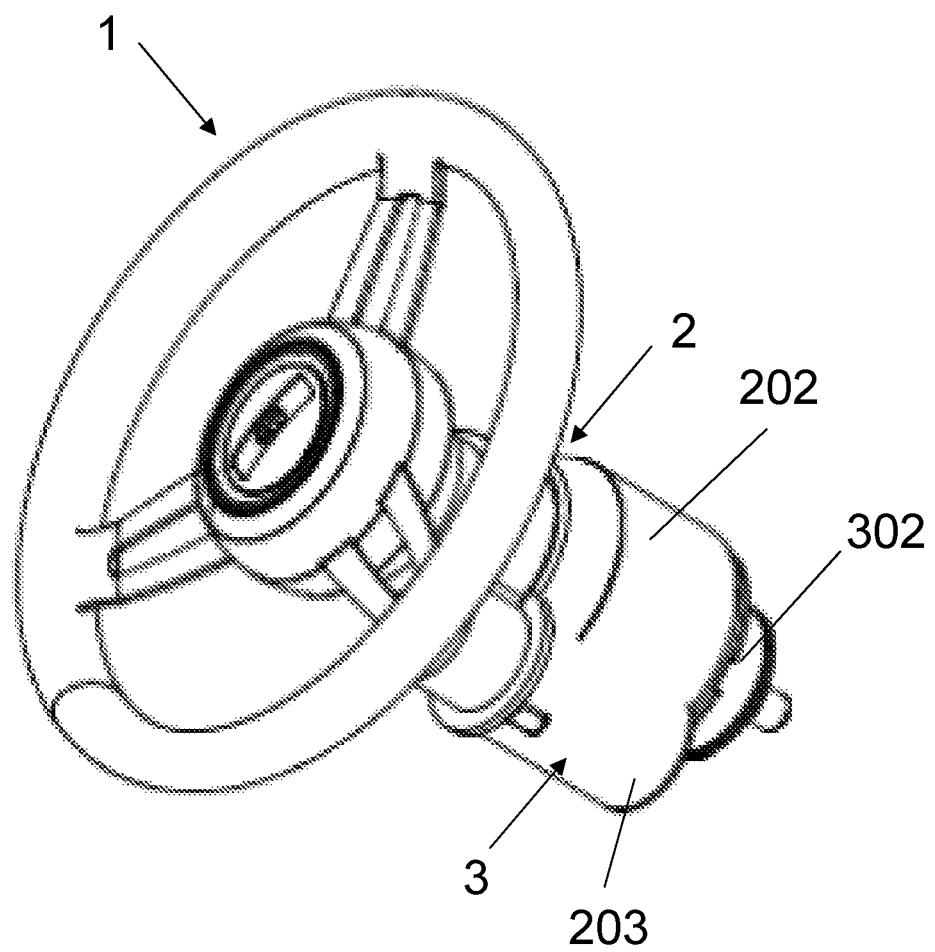
FIGS. 7 and 8 are a further embodiment of the invention where the motor of the electric motor/transmission assembly is mounted with its axis parallel to the axis of the driving shaft of the hydraulic pump and the electric motor/transmission assembly is dynamically coupled to said driving shaft on the same side of the hydraulic pump where the steering wheel is provided.
Figure 8:
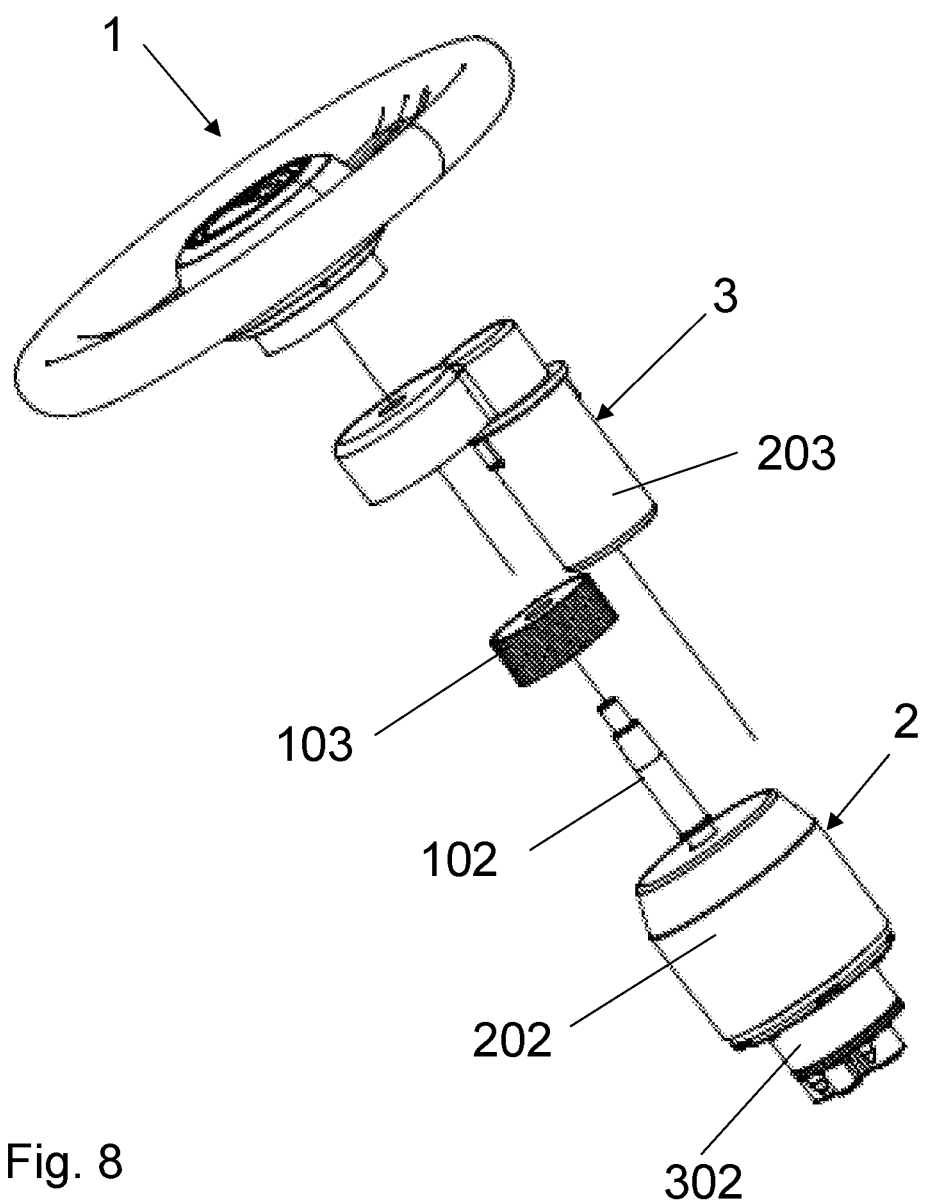

In the embodiment of FIGS. 7 and 8, the motor 203 of the electric motor/transmission assembly is arranged with the shaft parallel and laterally adjacent to the pump and to the driving shaft 102 thereof.

Also in this case, on the shaft in an intermediate position between the steering wheel 1 and the case of the pump 2 there is provided the pinion 103, while the shaft of the motor 203 bears a gear with axial teeth meshing with the axial teeth of the pinion 103.

In this embodiment, the electric motor 203 of the electric motor/transmission assembly 3 can be mounted in a housing integrated with the case of the pump 2 to form a single compact body. Moreover, the axial arrangement of the motor 203 provides for a reduction of axial overall dimensions of the assembly and also of radial overall dimensions with respect to the solutions of FIGS. 1 to 3 and 4 to 7.

Figure 9:
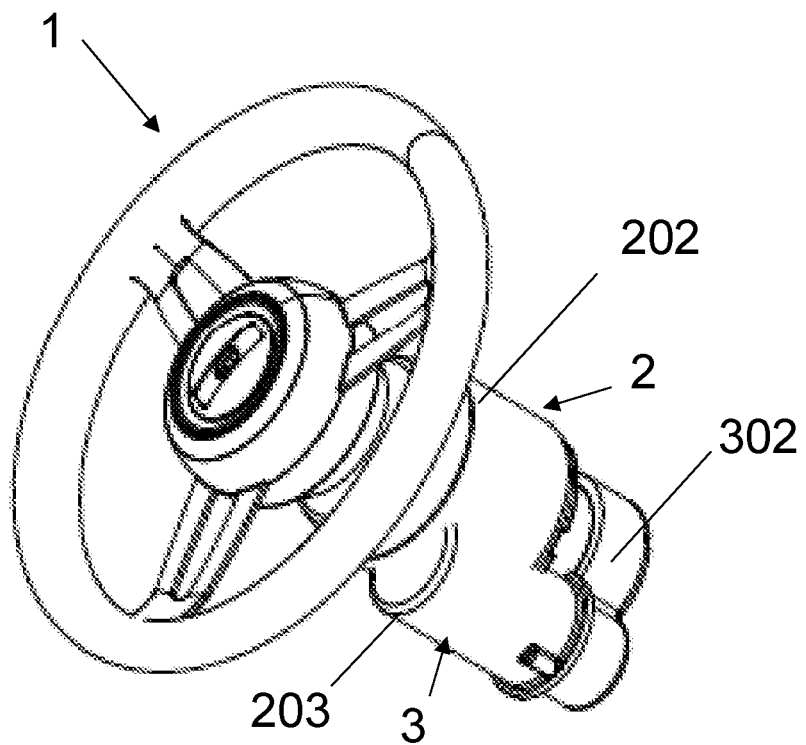
FIGS. 9 to 11 are a variant of FIGS. 7 and 8, where the driving shaft of the hydraulic pump extends beyond the head side opposite to the side fastening the steering wheel the electric motor/transmission assembly being coupled to the driving shaft at said extension.
Figure 10:
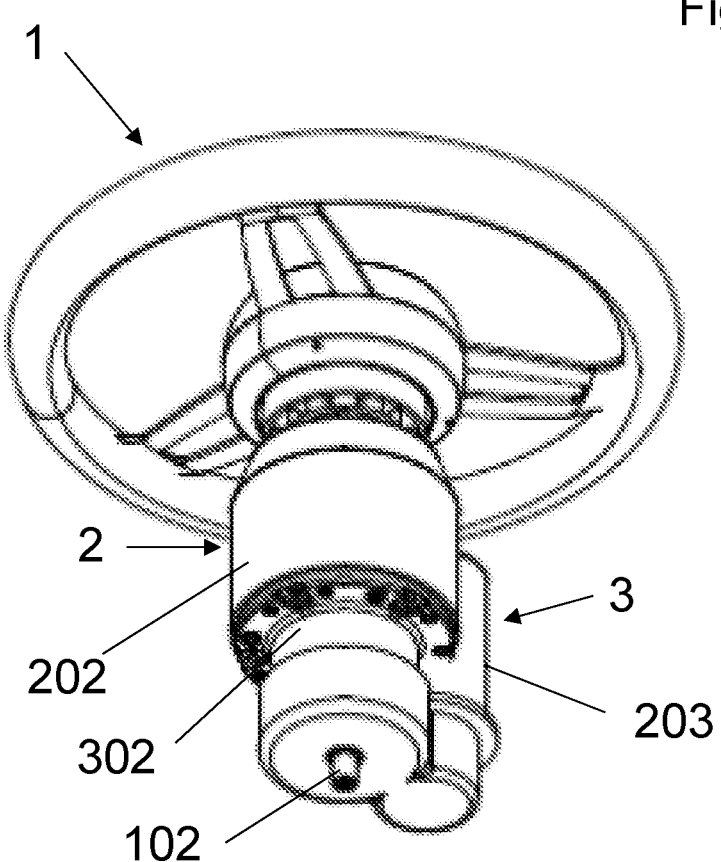
Figure 11:
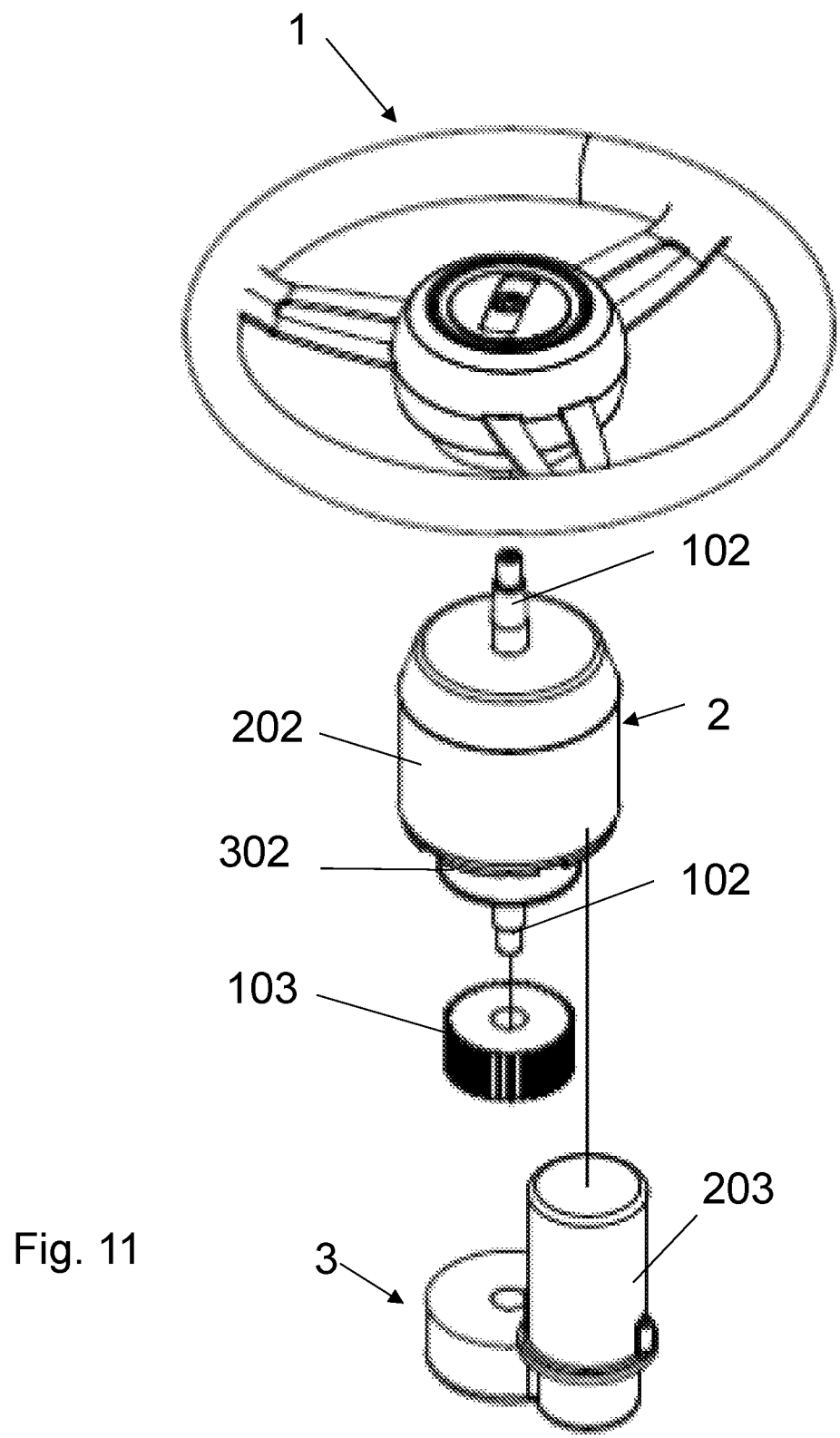

FIGS. 9 to 11 show a variant of the embodiment according to FIGS. 7 and 8, wherein like in the variant of FIGS. 4 to 6, the driving shaft of the pump 2 is extended on the side of the hydraulic pump 2 on which the distributor 302 is provided.

In this case the pinion 103 is fitted on said extension of the shaft 102 and the motor 203 is placed still on the side of the pump 2 with its shaft parallel to the shaft 102, that is, to the extension thereof.

Figure 13:
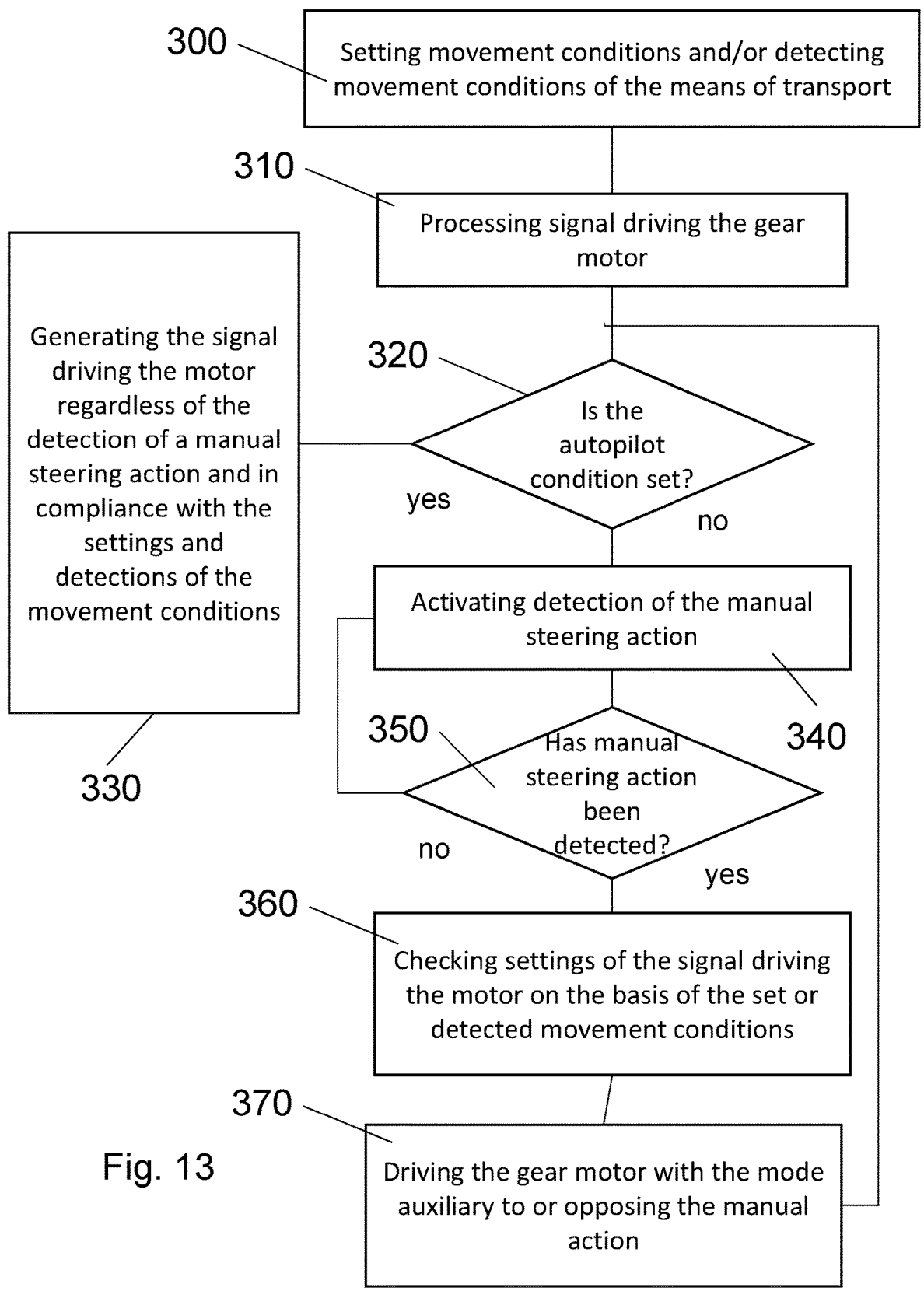
FIG. 13 is a flow chart of an example of the operation of the system according to the present invention.

FIG. 13 shows a flow chart of an example of operation of the system according to the present invention and particularly according to FIG. 12.

At step 300 the movement conditions of said vehicle are defined on the basis of setting controls and/or of detections of the movement conditions of the vehicle.

At step 310 on the basis of such data the signal powering the motor 203 of the electric motor/transmission assembly 3 is processed.

If step 320 defines that the autopilot condition is not set, then the step 330 is enabled that provides for generating the signal driving the motor regardless of the detection of a manual steering action and in compliance with the settings and detections of the movement conditions.

If on the contrary the autopilot condition is not set, then the system enables the condition detecting the driving of the manual steering control member 1 at step 340.

If at step 350 no manual action is detected, then the system continues monitoring the possible manual action. If on the contrary a manual operation is detected, then at step 350 a check is performed of whether the settings of the movement are sufficient to generate a signal driving the electric motor/transmission assembly 3 in a mode auxiliary to the manual action or a signal driving the electric motor/transmission assembly in a mode opposing the manual action. Finally, at step 360 the signal is transmitted to the electric motor/transmission assembly 3 and the loop goes on from step 320.

Although the present invention has been described with reference to a device that includes a hydraulic pump, it is possible to apply the same concept to a mechanical control system generating and transmitting the steering control to a direction changing member. In this case, instead of the oil-hydraulic pump it is possible to insert a mechanism transmitting the rotary motion of the steering control member, which can be provided with a shaft coupling the steering control member both at the front and at the rear with reference to the bridge. In this case the electric motor/transmission assembly can be applied both between the steering wheel and the mechanical device and on the side of the mechanical device opposite to the steering control member. The mechanism transmitting the rotational motion of the steering control member can be connected to the actuators driving the steering member by means of any type of mechanical transmission, such as for example by one or more metal cables that are pushed and/or pulled by the mechanism driven by the rotation of the steering control member.

The invention claimed is:

1. A hydraulic steering system for a vehicle comprising:
at least one steering control member;
a hydraulic pump provided with a driving shaft rotatable in two directions, wherein said steering control member is fitted on said hydraulic pump to cause a rotation of said driving shaft;
at least one hydraulic actuating cylinder connected to a delivery side and a return side of said pump;
an electric motor/transmission assembly; and
a control unit generating a power supply signal of the electric motor/transmission assembly, said control unit being connected to a plurality of sensors each detecting a specific movement condition of the vehicle, said plurality of sensors being selected from the group consisting of position sensors, speed sensors, sensors of steering angle, sensors of a number of revolutions of a motor of the vehicle, sensors of wind direction or strength, sensors of obstacles, and accelerometers,
wherein said actuating cylinder forms a hydraulic circuit with said hydraulic pump;
wherein said actuating cylinder is mechanically articulated with a direction changing member, said direction changing member determining a change in direction by modifying orientation of said direction changing member with respect to an axis of the vehicle;
wherein the change in the orientation of said direction changing member is performed by said actuating cylinder as a function of supply of hydraulic fluid to said actuating cylinder caused by operation of the hydraulic pump by the steering control member;
wherein the driving shaft of the hydraulic pump is connected with the electric motor/transmission assembly, which is configured to perform each of the following functions:
(a) generating a first rotational force auxiliary to a manually exerted movement on the steering control member;
(b) generating a second rotational force opposing said manually exerted movement and sufficient to generate a predetermined resistance to a displacement of the direction changing member, thereby preventing an accidental steering of the steering control member; or
(c) rotatably driving the driving shaft of the pump to drive the vehicle autonomously independently of the manually exerted movement, and
wherein the control unit is configured to activate the electric motor/transmission assembly to perform each of the following functions:
functions (a) or (b), based on signals generated from the plurality of sensors, and
function (c), based on direction settings entered by a user, and signals of travel conditions along a path or presence of obstacles along a path transmitted to said control unit by the plurality of sensors.

2. The hydraulic steering system according to claim 1, wherein the plurality of sensors detecting the manual rotation of the steering control member generate a signal activating a motor of the electric motor/transmission assembly, said signal activating the motor being read by the control unit.

3. The hydraulic steering system according to claim 1, further comprising a command setting at least an automatic steering condition to enable operation according to option (c), said command activating the control unit to execute an auto pilot program that generates a power supply signal of the electric motor/transmission assembly based on direction settings entered by a user, and signals generated by one or more of the plurality of sensors.

4. The hydraulic steering system according to claim 1, wherein the electric motor/transmission assembly comprises an electric motor and a pair of gears that are rotatably engaged with each other, one of said gears being fitted on a shaft of the electric motor and the other gear being fitted instead on the driving shaft of the hydraulic pump.

5. The hydraulic steering system according to claim 4, wherein the electric motor of the electric motor/transmission assembly is provided on a side of the pump, the shaft of said electric motor being parallel to the driving shaft of the pump, and wherein the gears with axial teeth engaged with each other are fitted on the driving shaft and on the shaft of the electric motor.

6. The hydraulic steering system according to claim 4, further comprising one or more detection sensors that detect a movement of the steering control member or of the shaft of the electric motor, or one or more detection sensors that are composed of an electromagnetic pulse generated by the electric motor generated when a manual rotation of the steering control member causes a rotor of the electric motor to rotate.

7. The hydraulic steering system according to claim 1, wherein the electric motor/transmission assembly is provided at an intermediate position between the steering control member and the hydraulic pump.

8. The hydraulic steering system according to claim 1, wherein the driving shaft of the hydraulic pump protrudes by a second end from a head side of the pump opposite to a side fastening the steering control member, and wherein the electric motor/transmission assembly is coupled to the driving shaft of the pump at said second end.

9. The hydraulic steering system according to claim 1, further comprising an interface displaying one or more of settings or data corresponding to the signals generated by the plurality of sensors and operation of the electric motor/transmission assembly.

10. The hydraulic steering system according to claim 1, wherein the control unit comprises at least a memory and one processor, said memory containing a control program for processing data about a movement condition of the vehicle, and for generating controls driving the electric motor/transmission assembly for automatic control of direction changing members based on data acquired by said sensors.

11. The hydraulic steering system according to claim 10, further comprising a display connected to said control unit and a program displaying cruising conditions and setting the steering system, said program generating a graphical interface on the display displaying said data.

* * * * *